3,407,243
NOVEL CATALYST AND PROCESS FOR
PREPARING ACYCLIC POLYOLEFINS
Harold W. Hyde and Ross Van Volkenburgh, Baton Rouge, La., assignors to Copolymer Rubber & Chemical Corporation, a corporation of Louisiana
No Drawing. Filed Jan. 19, 1962, Ser. No. 167,439
18 Claims. (Cl. 260—677)

This invention relates to novel acyclic polyolefins and to compositions and a process for preparing the same. In some of its more specific aspects, the invention further relates to a novel catalyst which is especially useful in the process of the invention, and to compositions and a process for preparing the catalyst.

When using catalysts and reaction conditions of the prior art, butadiene may be polymerized to produce acyclic polymers of high molecular weight in which a relatively large number of butadiene units are joined to produce a long carbon chain. It has not been possible heretofore to control effectively the length of the carbon chain and produce acyclic compounds of relatively low molecular weight having a definite molecular structure. In instances where it is possible to control the molecular weight and structure in accordance with prior art practice, the resultant product is always a cyclic compound in which two, three, or more butadiene molecules are joined to form a cycloolefin such as, for example, 4-vinyl-1-cyclohexene or 1,5,9-cyclododecatriene. It has not been possible heretofore to accomplish the oligomerization of butadiene to produce acyclic polyolefins which are, for example, dimers, trimers, tetrimers, etc. of butadiene having a definite molecular structure.

It is an object of the present invention to provide novel acyclic polyolefins prepared from butadiene, and a novel process for their preparation.

It is a further object to provide the novel compounds 3 - methyl - 1,4,6-heptatriene, 3-methyl-1,5,8,10-undecatetraene, and 3-methyl-1,4,8,10-undecatetraene, and a novel process for their preparation.

It is still a further object to provide a novel cobalt-containing catalyst which is especially useful in the process of the invention, and a novel process for preparation of the catalyst.

It is still a further object to provide novel compositions of matter which are especially useful in preparing the catalyst and/or the acyclic polyolefins of the invention.

Still other objects of the invention and the attendant advantages will be apparent to those skilled in the art upon reference to the following detailed description and the examples.

In accordance with one aspect of the present invention, novel acyclic polyolefins are prepared by reaction of butadiene in the presence of the novel catalyst to be described more fully hereinafter. The process of the invention is especially useful in preparing oligomers of butadiene of relatively low molecular weight such as the dimer, trimer, tetramer and pentamer.

The novel acyclic polyolefins have the following general formula:

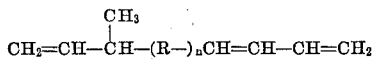

wherein R is a monoethylenically unsaturated bifunctional hydrocarbon radical containing four carbon atoms and $n$ is a whole number. Preferably, R is derived from butadiene and may have, for example, one of the following structural formulae: $-CH_2-CH=CH-CH_2-$, $-CH=CH-CH_2-CH_2-$ and

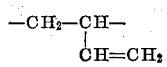

The value for $n$ may vary over a wide range such as from 0 through 30, but preferably R has a value of 0 through 10. In most instances, preferred products are produced when $n$ has a value of 0 through 5 or 1 through 5. Specific examples of oligomers having many unusual and desirable properties are the dimer 3-methyl-1,4,6-heptatriene and the trimers 3-methyl-1,5,8,10-undecatetraene and 3-methyl-1,4,8,10-undecatetraene.

The novel catalyst for use in preparing the acyclic polyolefins of the invention may be prepared from a cobalt compound and a borohydride compound. The cobalt compound may be organic or inorganic in nature, and usually it is preferred that the cobalt be in the plus 2 oxidation state. Specific examples of inorganic cobalt compounds include cobalt salts of mineral acids such as the cobalt halides and preferably cobalt chloride. Specific examples of organic compounds include cobalt salts of carboxylic acids such as cobalt naphthenate and cobalt stearate, and organic complexes of cobalt such as cobalt acetylacetonate, etc. Specific examples of borohydride compounds which are especially useful include sodium, potassium and lithium borohydrides.

When preparing the catalyst, the ratio of borohydride to cobalt must be greater than 2/3 and preferably the $BH_4^-$/cobalt ratio is at least 1/1. There does not appear to be a definite upper limit on the $BH_4^-$/cobalt ratio, but for economic reasons it is usually preferred that the ratio be not greater than 30/1. The preferred ratio is usually between about 1/1 and about 10/1, and often best results are obtained when the ratio is between about 1/1 and 3/1. The $BH_4^-$/cobalt ratio is based upon the quantities of borohydride compound and cobalt compound used in preparing the catalyst, i.e., upon the number of gram ion weights of $BH_4^-$ that are present in the quantity of the borohydride compound and the number of gram atomic weights of cobalt present in the quantity of the cobalt-containing compound.

The amount of catalyst employed may vary over wide ranges. For example, the ratio of the number of gram mols of butadiene to be reacted to the number of gram atomic weights of cobalt in the catalyst may be 50–1000 to 1, and higher or lower ratios may be used if desired. Much higher ratios of butadiene are especially useful in instances where butadiene is present in large excess and acts as a solvent, and in such instances the preferred catalyst concentrations may be best defined in terms of the reactant concentrations. For instance, a cobalt concentration in the reaction mixture of 3–300 millimoles per liter is very effective. The borohydride concentration or content of the amount of catalyst which may be employed is defined by the borohydride to cobalt ratio discussed above. Butadiene concentrations of 1 to 10 mols per liter are especially desirable, but lower concentrations may be used until the concentration of butadiene is about that of the catalyst. The upper limit of butadiene concentration exists when no solvent is present in the system and in such instances "excess" liquid butadiene may be thought of as acting as the solvent for the portion of butadiene actually entering into the reaction.

A wide variety of organic solvents are satisfactory for preparing the novel catalyst and/or carrying out the reaction of butadiene to produce the novel acyclic polyolefins. Specific examples include ethers, alcohols, hydrocarbons, etc., which are in the liquid phase under the reaction conditions. Lower aliphatic alcohols, ethers and hydrocarbons containing 1–8 and preferably 1–4 carbon atoms are especially desirable as solvents. It is not essential that the organic solvent be anhydrous, and water may be present in some instances provided a liquid aqueous phase is not formed. Preferably the reaction is carried out in an organic solvent for the catalyst or catalyst components and butadiene under conditions whereby the resultant solution forms the only liquid phase and the solution contains butadiene to be reacted and the catalyst dissolved therein. It is understood that undissolved butadiene, catalyst or catalyst components may be present when desired.

When preparing the catalyst, it is essential that the butadiene be present at the time of reacting the borohydride compound with the cobalt-containing compound. Otherwise, a satisfactory catalyst is not obtained and the resultant black cobalt-containing precipitate is inactive as a catalyst for use in preparing the novel acyclic polyolefins of the present invention. When the catalyst is prepared properly in accordance with the present invention and in the presence of butadiene, the resultant solution usually is light brown to yellow in color and may contain some yellow precipitate in some instances. The active catalyst is thought to be a butadiene complex of cobalt. For example, it is though that the cobalt may be present in the catalyst in an unusual oxidation state such as plus one, and stabilized in the unusual oxidation state by complexing with the butadiene.

The catalyst may be prepared by a number of procedures. For example, a soluble cobalt-containing compound or the borohydride compound is added to the solvent, then butadiene is added if not already present, and finally the remaining component of the catalyst is added. When the solvent does not contain butadiene, the preferred procedure is to add the cobalt compound to solvent contained in a vessel designed to contain butadiene in the liquid phase under pressure, then butadiene is charged to the cobalt-containing solution and preferably in an amount sufficient to complex all of the cobalt, and thereafter the borohydride compound is added. Preferably, the solvent is ethanol or other suitable aliphatic alcohol containing 1–4 to 8 carbon atoms. When desired, the solvent may contain large amounts of butadiene, or butadiene itself may be present as a solvent. Thus, the catalyst may be prepared in the reaction mixture in the presence of all or part of the butadiene to be reacted and the reaction allowed to proceed immediately with or without further addition of butadiene. Alternatively, the butadiene to be reacted may be added to the vessel containing prepared catalyst, or the prepared catalyst may be added to butadiene or to a butadiene-containing solution.

The reaction mixture containing butadiene and catalyst may be allowed to react under liquid phase conditions for any suitable period of time. For instance, the reaction may be allowed to take place over a period varying from a few minutes up to several days, but in most instances preferably from about 30 minutes to about 24 hours. The reaction temperature may be, for example, from about 20–25° C. up to about 75–100° C. In some instances, lower or higher reaction temperatures are satisfactory, as 100–200° C. or higher, depending upon the reaction solvent and conditions employed to maintain liquid phase conditions. At higher reaction temperatures the pressure required to maintain liquid phase conditions often becomes excessive and thus lower reaction temperatures below about 75–100° C. may be preferred. Usually when operating at temperatures up to about 75–100° C., a reaction time of about 10–17 hours is preferred. As a general rule, higher reaction temperatures and longer periods of reaction tend to produce a higher molecular weight product when using a given catalyst composition and ratio of catalyst to butadiene. Thus, when it is desired to produce low molecular weight products such as the dimer or trimer, then within the recited ranges shorter periods of reaction at lower reaction temperatures may be desired.

It has been discovered that the nature of the acyclic polyolefin reaction products depend to some extent upon the catalyst concentration and composition and that the factors which favor occurrence of the reaction also favor the formation of higher boiling products. Thus, improved yields of higher molecular weight products may be prepared under conditions which favor occurrence of the reaction, i.e., increasing the total catalyst to butadiene ratio and increasing the borohydride to cobalt ratio. Improved yields of lower molecular weight products may be prepared under conditions which tend to be less favorable toward occurrence of the reaction such as a low catalyst to butadiene ratio and a low borohydride to cobalt ratio. The reaction mixture usually contains some dimer, trimer and higher molecular weight products, and may be separated into the individual oligomer by distillation.

An increase in the butadiene concentration while maintaining all other variables constant usually has no effect upon the initial rate of the reaction. Also, the reaction goes to about the same conversion, thus in effect converting more butadiene to the oligomer with the same amount of catalyst. Therefore, in instances where butadiene is substituted as a solvent, no appreciable decrease in the butadiene conversion rate occurs and a much larger quantity of butadiene is reacted for the same amount of catalyst.

Kinetic data indicate that the rate of formation of the butadiene dimer initially is linear with time, but falls off rapidly as the final concentration of the dimer in the reaction mixture is approached. Optimum yields are obtained when the reaction is allowed to proceed to near completion, but extended reaction periods usually are not desirable as side reactions become more pronounced. An increase in the reaction temperature causes an increase in reaction rate. For instance, a change in the reaction temperature from 25° C. to 65° C. in a butadiene dimer preparation recipe causes the formation of a mixture of butadiene dimer and trimer. Reaction solvent has little effect, and replacement of a portion of the solvent by butadiene usually does not affect the reaction rate. While ethanol often is the preferred solvent, replacement of a portion of the ethanol by butadiene, dimethoxyethane, benzene, etc. does not result in an appreciable change in product yield. Sodium borohydride is the preferred borohydride compound for use in preparing the catalyst, but other suitable borohydrides may be substituted. Sodium borohydride preferably is used as an ethanolic solution, but base stabilized aqueous solutions may be used when the base is first neutralized with carbon dioxide or other suitable acidic substance.

The acyclic polyolefins of the invention have many important uses. For instances, they may be employed as monomers in polymerizations, either alone or in combination with other monomers such as butadiene and/or styrene, to thereby produce a polymer with branched side chains. The resultant polymers have many desirable properties which cause them to be especially useful as materials for preparing articles. The acyclic polyolefins of the invention also may be employed as a feed to an Oxo process to thereby produce polyols which are especially useful in preparing polyesters and polyethers, or they may be condensed by means of a Diels-Alder reaction with dieneophiles of the general formulae I 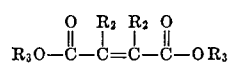

and

II 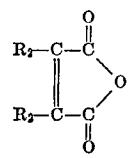

wherein $R_2$ and $R_3$ are monovalent substituents, to produce novel products. When the dieneophile is an anhydride of Formula II, the resultant adduct is especially useful as a curing agent for epoxy resins.

The foregoing detailed description and the following specific examples are for purposes of illustration only, and are not intended as being limiting to the spirit or scope of the appended claims.

EXAMPLE I

This example illustrates the preparation of 3-methyl-1,4,6-heptatriene.

A total of 11 seven ounce beverage bottles were charged with 108 ml. each of 0.011 M cobaltous chloride in ethanol (95%). The bottles were capped and 13.2 gms. of butadiene was added to each bottle by syringe followed by 5 ml. of a 0.5 M solution of sodium borohydride in ethanol. The bottles were shaken for 17 hours at ambient temperature. The contents of the 11 bottles were combined, poured into one liter of water, and the mixture extracted with 0.5 liter of pentane. The pentane layer was distilled to give 32.3 gms. of product.

Freezing point molecular weight determination showed that the product was a dimer of butadiene and elemental analysis gave an empirical formula of $C_4H_6$, and thus a molecular formula of $C_8H_{12}$. Hydrogenation of the dimer required 3 mols of hydrogen per mol of dimer, thereby indicating the presence of 3 double bonds per molecule. This was also confirmed by elemental analysis of the hydrogenated product which had a molecular formula of $C_8H_{18}$. The infrared spectra for the hydrogenated product was identical with that reported for 3-methyl-heptane, thereby establishing the carbon skeleton of the dimer. Nuclear magnetic resonance spectra determined the 1, 4, and 6 positions of the double bonds in the dimer.

In view of the above, the dimer was proved to be 3-methyl-1,4,6-heptatriene. The infrared spectra was also in agreement with this structure.

An analytical sample was prepared by redistillation and analyzed. The following data were obtained:

Calculated for $C_8H_{12}$: C, 88.81; H, 11.19. Found for $C_8H_{12}$: C, 88.17; H, 11.16.

A solution of 10.8 gms. (0.1 mol) of the product and 50 ml. of decalin was hydrogenated in a Paar apparatus at room temperature in the presence of 0.1 gm. of 10% Pd/C as a catalyst. The resultant pressure drop corresponded to 0.3 mol of hydrogen. The reaction mixture was filtered and the filtrate distilled through a spinning band column to give 5.4 gms. of 3-methylheptane, B.P. 117-119°. A center cut was removed for analysis. Upon analysis, the following data were obtained:

*Analysis.*—Calc.: C, 84.12; H, 15.88. Found: C, 84.39; 84.36; H, 15.85, 15.85.

EXAMPLE II

The general procedure of Example I was followed with the exception that the reaction was carried out for 5 days at ambient temperature. Vapor phase chromatography indicated 2.68 gms. of butadiene and 6.37 gms. of 3-methyl-1,4,6-heptatriene per bottle.

EXAMPLE III

The general procedure of Example I was followed with the exception that 13 bottles were used and the reaction was carried out at 65° for 17 hours. Distillation of the contents of the 13 bottles gave 37.4 gms. of 3-methyl-1,4,6-heptatriene and 24.8 gms. of a mixture of the trimers 3-methyl-1,5,8,10-undecatetraene and 3-methyl-1,4,8,10-undecatetraene.

The infrared spectra of the trimers were virtually identical with that of the dimer produced in accordance with Example I with the exception of trans-olefin absorption. Also, hydrogenation required 4 mols of hydrogen per mol of trimer, thereby giving a product analyzing as $C_{12}H_{26}$. The nuclear magnetic resonance spectra of the trimer mixture indicated two products were present and, in view of the above data, one was 3-methyl-1,5,8,10-undecatetraene and the other 3-methyl-1,4,8,10-undecatetraene.

A solution of 8.1 gms. (0.05 mol) of trimer and 100 ml. of ethyl acetate was hydrogenated in a Paar apparatus at room temperature in the presence of 0.1 gm. of 10% Pd/C as a catalyst. The resultant pressure drop corresponded to 0.2 mol of hydrogen. The reaction mixture was filtered and the filtrate distilled through a spinning band column to give 5.3 gms. of 3-methylundecane. A center cut was removed for analysis. Upon analysis, the following data were obtained:

*Analysis.*—Calculated: C, 84.62; H, 15.37. Found: C, 84.53; H, 15.11.

EXAMPLE IV

The general procedure of Example I was followed with the exception that 38 ml. of 0.039 M cobaltous chloride and 39.4 gms. of butadiene were charged to each bottle. Distillation gave 10.5 gms. of 3-methyl-1,4,6-heptatriene per bottle.

EXAMPLE V

A commercial aqueous solution of sodium borohydride (12%) and sodium hydroxide (40%), was diluted 1:6.7 with water and the pH of the solution adjusted with $CO_2$ to 10.8. Five ml. of this solution was substituted for the ethanolic sodium borohydride solution used in each bottle in Example III, and otherwise the general procedure of Example III was repeated. Vapor phase chromatography indicated 10.4 gms. of butadiene and 1.1 gms. of 3-methyl-1,4,6-heptatriene per bottle.

EXAMPLE VI

The general procedure of Example III was repeated with the exception of using 100 ml. of a 0.012 M solution of cobalt acetylacetonate in 1,2-dimethoxyethane as a substitute for the ethanolic cobalt chloride solution. From 7 bottles, 7.8 gms. of 3-methyl-1,4,6-heptatriene, 13.8 gms. of 3-methyl-1,5,8,10-undecatetraene and 3-methyl-1,4,8,10-undecatetraene, and 13.2 gms. of higher boiling oligomers were obtained.

Redistillation of the trimer fraction through the spinning band column at 5 mm. with removal of a center cut (72°) gave an analytical sample. Upon analysis, the following data were obtained:

*Analysis.*—Calculated: C, 88.81; H, 11.19. Found: C, 88.17; H, 11.06.

EXAMPLE VII

Thirty-six milliliters (1.6 mmols) of a 0.044 M solution of cobaltous chloride in ethanol and 72 ml. of ethanol were added to a 7 oz. beverage bottle. The bottle was capped and successive additions of 11.7 gms. of butadiene and 5 ml. (2.3 mmols) of a 0.46 M solution of sodium borohydride in ethanol were made. A series of 14 such bottles were shaken at 65° C. for 17 hours, poured into water and extracted with pentane. The pentane extracts were washed with water, dried over sodium sulfate and distilled to give the following products:

| Fraction | Wt., gms. | Wt., percent |
| --- | --- | --- |
| Dimer | 37.4 | 22.8 |
| Trimer | 24.8 | 15.1 |
| Butadiene | 20.0 | 12.1 |
| Intermediate | 11.1 | 6.7 |
| Residue | 30.1 | 18.2 |

Redistillation of the trimer fraction through the spinning band column at 5 mm. with removal of a center cut (72°) gave an analytical sample. Upon analysis, the following data were obtained:

*Analysis.*—Calculated: C, 88.81; H, 11.19. Found: C, 88.17; H, 11.06.

EXAMPLE VIII

A solution of 21.6 gms. of maleic anhydride, 21.6 gms. of 3-methyl-1,4,6-heptatriene prepared in accordance with the general procedure of Example I and 50 ml. of benzene was refluxed for 12 hours after an initial exothermic reaction had subsided. The solution was poured into 250 ml. of pentane, concentrated and cooled to give 34.1 gms. of the Diels-Alder adduct [3-(1-methyl-2-propenyl)-4-cyclohexene-1,2-dicarboxylic anhydride].

After recrystallization from pentane and benzene, the 3 - (1 - methyl - 2 - propenyl) - 4 - cyclohexene - 1,2 - dicarboxylic anhydride melted at 61–62° C. Upon analysis, the following data were obtained:

*Analysis.*—Calculated: C, 69.88; H, 6.84. Found: C, 69.79; H, 6.71.

The corresponding diacid may be produced by substituting maleic acid in the Diels-Alder reaction.

EXAMPLE IX

This example illustrates the use of the anhydride product of Example VIII as a curing agent for epoxy resins.

To 2.8 grams of a commercial epoxy resin ("Epoxide 201," a product of Union Carbide Corporation) was added 1.85 grams of 3-(1-methyl-2-propenyl)-4-cyclohexene-1,2-dicarboxylic anhydride prepared in accordance with the procedure of Example VIII. The addition was at a temperature of 70° C., and thereafter the mixture was heated at 140° C. for 4 hours to thereby produce a clear, hard cured epoxy resin.

What is claimed is:

1. A process for preparing acyclic polyolefins comprising reacting butadiene in solution in an organic solvent in the presence of an oligomerization catalyst consisting essentially of the reaction product prepared by reacting together in solution in an organic solvent a borohydride compound and a cobalt-containing compound in the presence of butadiene in an amount to complex the cobalt, the borohydride compound and the cobalt-containing compound being present in quantities to provide a $BH_4^-$/cobalt ratio greater than 2/3, and the $BH_4^-$/cobalt ratio being based upon the number of gram ion weights of $BR_4^-$ present in the quantity of the borohydride compound and the number of gram atomic weights of cobalt present in the quantity of the cobalt-containing compound.

2. The process of claim 1 wherein the organic solvent comprises at least one solvent selected from the group consisting of alcohols, ethers and hydrocarbons.

3. The process of claim 1 wherein the organic solvent comprises liquefied butadiene.

4. The process of claim 1 wherein the borohydride compound comprises at least one substance selected from the group consisting of lithium, sodium and potassium borohydrides.

5. The process of claim 1 wherein the borohydride compound is sodium borohydride.

6. The process of claim 1 wherein the cobalt compound comprises at least one substance selected from the group consisting of cobalt chloride, cobalt acetylacetonate, and cobalt naphthenate.

7. The process of claim 1 wherein the $BH_4^-$/cobalt ratio is between about 1/1 and about 10/1.

8. The process of claim 1 wherein the $BH_4^-$/cobalt ratio is between about 1/1 and about 3/1.

9. The process of claim 1 wherein the borohydride compound comprises at least one substance selected from the group consisting of lithium, sodium and potassium borohydrides, the cobalt compound is selected from the group consisting of cobalt chloride, cobalt acetylacetonate and cobalt naphthenate, and the $BH_4^-$/cobalt ratio is between about 1/1 and about 10/1.

10. The process of claim 1 wherein the borohydride compound is sodium borohydride, the cobalt compound comprises at least one substance selected from the group consisting of cobalt chloride, cobalt acetylacetonate and cobalt naphthenate, and the $BH_4^-$/cobalt ratio is between about 1/1 and about 10/1.

11. The process of claim 1 wherein the catalyst is present in an amount to provide a cobalt concentration of about 3–300 millimoles per liter.

12. The process of claim 1 wherein the reaction mixture contains about 50–1,000 moles of butadiene for each gram atomic weight of cobalt.

13. An oligomerization catalyst consisting essentially of the reaction product prepared by reacting together in solution in an organic solvent a borohydride compound and a cobalt-containing compound in the presence of butadiene in an amount to complex the cobalt, the borohydride compound and the cobalt-containing compound being reacted in quantities to provide a $BH_4^-$/cobalt ratio greater than 2/3, and the $BH_4^-$/cobalt ratio being based upon the number of gram ion weights of $BH_4^-$ present in the quantity of the borohydride compound and the number of gram atomic weights of cobalt present in the quantity of the cobalt-containing compound.

14. The product of claim 13 wherein the borohydride compound comprises at least one substance selected from the group consisting of lithium, sodium and potassium borohydrides.

15. The product of claim 13 wherein the borohydride compound is sodium borohydride.

16. The product of claim 13 wherein the cobalt compound comprises at least one substance selected from the group consisting of cobalt chloride, cobalt acetylacetonate and cobalt naphthenate.

17. The product of claim 13 wherein the borohydride compound comprises at least one substance selected from the group consisting of lithium, sodium and potassium borohydrides, the cobalt compound comprises at least one substance selected from the group consisting of cobalt chloride, cobalt acetylacetonate and cobalt naphthenate, and the $BH_4^-$/cobalt ratio is between about 1/1 and about 10/1.

18. The product of claim 13 wherein the borohydride compound is sodium borohydride, the cobalt compound comprises at least one substance selected from the group consisting of cobalt chloride, cobalt acetylacetonate and cobalt naphthenate, and the $BH_4^-$/cobalt ratio is between about 1/1 and about 10/1.

References Cited

UNITED STATES PATENTS

| 3,141,031 | 7/1964 | Wilkinson | 260—439 |
| 2,434,402 | 1/1948 | Fleer | 260—439 |
| 2,600,571 | 6/1952 | Prichard | 260—439 |
| 2,748,108 | 5/1956 | Paul et al. | 252—432 |
| 3,009,969 | 11/1961 | Spencer et al. | 260—666 |
| 3,067,189 | 12/1962 | Balas | 252—432 |

OTHER REFERENCES

Derwent Belgian Patents Report, vol. 79A, page C5.

Faraday's Encyclopedia of Hydrocarbon Compounds, pub. by Chemindex Ltd., London, 1958, vol. 3a, page 08082.00.11.

PAUL M. COUGHLAN, Jr., *Primary Examiner.*